United States Patent
Woerz

(10) Patent No.: US 11,772,077 B2
(45) Date of Patent: Oct. 3, 2023

(54) PASSIVE NITROGEN OXIDE ADSORBER HAVING OXIDATION-CATALYTICALLY ACTIVE FUNCTION

(71) Applicant: UMICORE AG & CO. KG, Hanau-Wolfgang (DE)

(72) Inventor: Anke Woerz, Frankfurt (DE)

(73) Assignee: UMICORE AG & CO. KG, Hanau-Wolfgang (DE)

( * ) Notice: Subject to any disclaimer, the term of this patent is extended or adjusted under 35 U.S.C. 154(b) by 146 days.

(21) Appl. No.: 17/420,462

(22) PCT Filed: Jan. 8, 2020

(86) PCT No.: PCT/EP2020/050240
§ 371 (c)(1),
(2) Date: Jul. 2, 2021

(87) PCT Pub. No.: WO2020/144195
PCT Pub. Date: Jul. 16, 2020

(65) Prior Publication Data
US 2022/0080394 A1 Mar. 17, 2022

(30) Foreign Application Priority Data
Jan. 8, 2019 (EP) ..................... 19150643

(51) Int. Cl.
| | | |
|---|---|---|
| *B01J 23/44* | (2006.01) | |
| *B01J 21/12* | (2006.01) | |
| *B01J 29/70* | (2006.01) | |
| *B01J 35/00* | (2006.01) | |
| *B01J 35/04* | (2006.01) | |
| *B01J 37/02* | (2006.01) | |
| *B01D 53/94* | (2006.01) | |
| *F01N 3/08* | (2006.01) | |
| *F01N 3/20* | (2006.01) | |
| *F01N 3/28* | (2006.01) | |

(52) U.S. Cl.
CPC ............ *B01J 23/44* (2013.01); *B01D 53/944* (2013.01); *B01D 53/9422* (2013.01); *B01D 53/9468* (2013.01); *B01D 53/9477* (2013.01); *B01J 21/12* (2013.01); *B01J 29/7007* (2013.01); *B01J 35/0006* (2013.01); *B01J 35/04* (2013.01); *B01J 37/0244* (2013.01); *B01D 2255/1021* (2013.01); *B01D 2255/1023* (2013.01); *B01D 2255/50* (2013.01); *B01D 2255/9022* (2013.01); *B01D 2255/91* (2013.01); *B01D 2255/9155* (2013.01); *F01N 3/0842* (2013.01); *F01N 3/2066* (2013.01); *F01N 3/2803* (2013.01); *F01N 2370/04* (2013.01)

(58) Field of Classification Search
CPC ........ B01J 23/44; B01J 21/12; B01J 29/7007; B01J 35/0006; B01J 35/04; B01J 37/0244; B01D 53/9422; B01D 53/944; B01D 53/9468; B01D 53/9477; B01D 2255/1021; B01D 2255/1023; B01D 2255/50; B01D 2255/9022; B01D 2255/91; B01D 2255/9155; F01N 3/0842; F01N 3/2066; F01N 3/2803; F01N 2370/04
See application file for complete search history.

(56) References Cited

U.S. PATENT DOCUMENTS

| | | | |
|---|---|---|---|
| 6,709,644 | B2 | 3/2004 | Zones et al. |
| 8,617,474 | B2 | 12/2013 | Bull et al. |
| 9,657,626 | B2 | 5/2017 | Theis et al. |
| 10,428,708 | B2 | 10/2019 | Utschig et al. |
| 2008/0141661 | A1 | 6/2008 | Voss et al. |
| 2009/0320457 | A1 | 12/2009 | Wan |
| 2014/0219878 | A1 | 8/2014 | Mccool et al. |
| 2014/0322112 | A1 | 10/2014 | Blakeman et al. |
| 2015/0273452 | A1 | 10/2015 | Chiffey et al. |
| 2016/0250594 | A1 | 9/2016 | Casci et al. |
| 2016/0279598 | A1 | 9/2016 | Collier |
| 2017/0001169 | A1 | 1/2017 | Collier et al. |
| 2017/0175607 | A1* | 6/2017 | De Smet ............... F01N 3/0842 |
| 2022/0339613 | A1* | 10/2022 | Collier .................. B01J 29/74 |

FOREIGN PATENT DOCUMENTS

| | | | | |
|---|---|---|---|---|
| DE | 202016102586 | U1 | 6/2016 | |
| EP | 0885650 | A2 | 12/1998 | |
| EP | 1393069 | A1 | 3/2004 | |
| EP | 1 420 149 | A2 | 5/2004 | |
| EP | 1 433 519 | A1 | 6/2004 | |
| EP | 1 561 919 | A1 | 8/2005 | |
| EP | 1 820 561 | A1 | 8/2007 | |
| EP | 2 505 803 | A2 | 10/2012 | |
| EP | 1 398 069 | A2 | 3/2014 | |
| WO | WO 02/095398 | A1 * | 11/2002 | ........... G01N 33/497 |
| WO | 2008/047170 | A1 | 4/2008 | |
| WO | 2008/106519 | A1 | 9/2008 | |
| WO | 2008/118434 | A1 | 10/2008 | |

(Continued)

OTHER PUBLICATIONS

International Search Report dated Feb. 20, 2020 for International Patent Application No. PCT/EP2020/050240 (4 pages in German with English Translation).

(Continued)

*Primary Examiner* — Timothy C Vanoy
(74) *Attorney, Agent, or Firm* — Smith, Gambrell & Russell, LLP

(57) ABSTRACT

The present invention relates to the use of a material B containing palladium and platinum in a weight ratio of 2:3 to 10:1 for increasing the low-temperature storage of nitrogen oxides by means of a material A containing palladium and zeolite, wherein material A and material B are present on a carrier substrate of the length L, and wherein material A and material B are different from one another.

16 Claims, 1 Drawing Sheet

(56) References Cited

FOREIGN PATENT DOCUMENTS

| WO | 2008/132452 | A2 | 11/2008 |
|----|-------------|----|---------|
| WO | 2012/029050 | A1 | 3/2012  |
| WO | 2012/071421 | A2 | 5/2012  |
| WO | 2012/156883 | A1 | 11/2012 |
| WO | 2012/166868 | A1 | 12/2012 |
| WO | 2014/184568 | A1 | 11/2014 |
| WO | 2015/085303 | A1 | 6/2015  |
| WO | 2016/020351 | A1 | 2/2016  |

OTHER PUBLICATIONS

Written Opinion of the International Searching Authority dated Feb. 20, 2020 for International Patent Application No. PCT/EP2020/050240 (5 pages in German with English Translation).

International Preliminary Report on Patentability dated Jun. 16, 2021 for International Patent Application No. PCT/EP2020/050240 (6 pages in German with English Translation).

DIN 66132: Bestimmung der spezifischen Oberfläche von Feststoffen durch Stickstoffadsorption; Einpunkt-Differenzverfahren nach Haul und Dümbgen. [Determination of specific surface area of solids by adsorption of nitrogen; single-point differential method according to Haul and Dümbgen.] Standard by Deutsches Institut Fur Normung E.V. [German National Standard], 1975. 5 pages in German with English machine translation.

Miyoshi, N., et al. Development of New Concept Three-Way Catalyst for Automotive Lean-Burn Engines. SAE Technical Paper Series 950809. 1995. pp. 121-130.

Baerlocher, Ch., et al. Atlas of Zeolite Framework Types, Elsevier, 2001. Published on behalf of the Structure Commission of the International Zeolite Association (306 pages).

T Mayer Feststoff-SCR-System auf Basis von Ammoniumcarbamat Dissertation TU Kaiserslautern 2005. In German with English Abstract (154 Pages).

\* cited by examiner

PASSIVE NITROGEN OXIDE ADSORBER HAVING OXIDATION-CATALYTICALLY ACTIVE FUNCTION

The present invention relates to a passive nitrogen oxide adsorber for the passive storage and thermal desorption of nitrogen oxides from the exhaust gas of a combustion engine, which comprises an oxidation-catalytically active layer that is rich in palladium.

The exhaust gas of motor vehicles that are operated with lean-burn combustion engines, such as diesel engines, also contains, in addition to carbon monoxide (CO) and nitrogen oxides (NOx), components that result from the incomplete combustion of the fuel in the combustion chamber of the cylinder. In addition to residual hydrocarbons (HC), which are usually also predominantly present in gaseous form, these include particle emissions, also referred to as "diesel soot" or "soot particles." These are complex agglomerates from predominantly carbonaceous particulate matter and an adhering liquid phase, which usually preponderantly consists of longer-chained hydrocarbon condensates. The liquid phase adhering to the solid components is also referred to as "soluble organic fraction SOF" or "volatile organic fraction VOF."

In order to clean such exhaust gases, the specified components must be converted as completely as possible into harmless compounds, which is only possible by using suitable catalysts.

Soot particles may be very effectively removed from the exhaust gas with the aid of particle filters. Wall-flow filters made of ceramic materials have proved particularly successful. These wall-flow filters are made up of a large number of parallel channels formed by porous walls. The channels are closed alternately at one end of the filter so that first channels are formed, which are open at the first side of the filter and closed at the second side of the filter, along with second channels, which are closed at the first side of the filter and open at the second side of the filter. The exhaust gas flowing into the first channels, for example, may leave the filter again only via the second channels and must flow through the porous walls between the first and second channels for this purpose. The particles are retained when the exhaust gas passes through the wall.

It is known that particle filters can be provided with catalytically active coatings. For example, EP1820561 A1 describes the coating of a diesel particle filter with a catalyst layer that facilitates the combustion of the filtered soot particles.

A known method for removing nitrogen oxides from exhaust gases in the presence of oxygen is selective catalytic reduction (SCR method) by means of ammonia on a suitable catalyst. In this method, the nitrogen oxides to be removed from the exhaust gas are converted to nitrogen and water using ammonia.

As SCR catalysts, for example, iron-exchanged and particularly copper-exchanged zeolites can be used; see for example WO2008/106519 A1, WO2008/118434 A1 and WO2008/132452 A2.

SCR catalysts for the conversion of nitrogen oxides with ammonia do not contain any precious metals, in particular no platinum and no palladium. In the presence of such metals, the oxidation of ammonia with oxygen into nitrogen oxides would be preferred, and the SCR reaction (conversion of ammonia with nitrogen oxide) would fall into second place. Where the literature sometimes speaks of platinum-exchanged or palladium-exchanged zeolites as "SCR catalysts," this does not refer to the $NH_3$ SCR reaction but to the reduction of nitrogen oxides by means of hydrocarbons. However, the latter conversion is not very selective and is therefore referred to as the "HC-DeNOx reaction" instead of the "SCR reaction."

The ammonia used as reducing agent can be made available by metering an ammonia precursor compound, such as urea, ammonium carbamate, or ammonium formate, into the exhaust tract and by subsequent hydrolysis.

SCR catalysts have the disadvantage that they only work above an exhaust gas temperature of approximately 180 to 200° C., and thus do not convert nitrogen oxides, which are formed in the cold-start phase of the engine.

In order to remove the nitrogen oxides, so-called nitrogen oxide storage catalysts are also known, for which the term, "Lean NOx Trap," or "LNT," is common. Their cleaning effect is based on the fact that, in a lean operating phase of the engine, the nitrogen oxides are stored by the storage material of the storage catalysts predominantly in the form of nitrates, and these oxides are decomposed again in a subsequent rich operating phase of the engine, and the nitrogen oxides released in this manner are converted into nitrogen, carbon dioxide, and water with the reducing exhaust gas components on the storage catalyst. This operating principle is described in, for example, SAE document SAE 950809.

As storage materials, oxides, carbonates, or hydroxides of magnesium, calcium, strontium, barium, alkali metals, rare earth metals, or mixtures thereof come, in particular, into consideration. As a result of their alkaline properties, these compounds are able to form nitrates with the acidic nitrogen oxides of the exhaust gas and to store them in this way. They are deposited with the highest possible dispersion on suitable carrier materials in order to generate a large interaction surface with the exhaust gas. As a rule, nitrogen oxide storage catalysts also contain precious metals, such as platinum, palladium, and/or rhodium as catalytically active components. Their task is, on the one hand, to oxidize NO to $NO_2$, as well as CO and HC to $CO_2$, under lean conditions and, on the other hand, to reduce released $NO_2$ to nitrogen during the rich-operating phases, in which the nitrogen oxide storage catalyst is regenerated.

Modern nitrogen oxide storage catalysts are described, for example, in EP0885650A2, US2009/320457, WO2012/029050 A1 and WO2016/020351 A1.

It is already known to combine soot particle filters and nitrogen oxide storage catalysts. For example, EP1420 149 A2 and US2008/141661 describe systems comprising a diesel particle filter and a nitrogen oxide storage catalyst arranged downstream.

Moreover, it has already been proposed in, for example, EP1398069 A2, EP1433519 A1, EP2505803 A2, and US2014/322112 to coat particle filters with nitrogen oxide storage catalysts.

US2014/322112 describes a zoning of the coating of the particle filter with nitrogen oxide storage catalyst in such a way that a zone starting from the upstream end of the particle filter is located in the input channels, and another zone starting from the downstream end of the particle filter is located in the output channels.

The procedure described in SAE Technical Paper 950809, in which the nitrogen oxides are stored by a nitrogen oxide storage catalyst in a lean operating phase of the engine and are released again in a subsequent rich operating phase, is also referred to as active nitrogen oxide storage.

In addition, a method known as passive nitrogen oxide storage has also been described. Here, nitrogen oxides are stored in a first temperature range and released again in a second temperature range, wherein the second temperature range is at higher temperatures than the first temperature range. Passive nitrogen oxide storage catalysts are used to implement this method, which are also referred to as PNA (for "passive NOx adsorbers").

Passive nitrogen oxide storage catalysts can be used to store nitrogen oxides, particularly at temperatures below 200° C., at which an SCR catalyst has not yet reached its operating temperature, and to release them again purely thermally, i.e. without enrichment of the exhaust gas (NOx desorption), as soon as the SCR catalyst is ready for operation. Through the intermediate storage of the nitrogen oxides emitted by the engine below 200° C. and their concerted release above 200° C., an increased total nitrogen oxide conversion of the exhaust gas aftertreatment system can thus be realized.

Palladium supported on cerium oxide has been described as a passive nitrogen oxide storage catalyst; see for example WO2008/047170 A1 and WO2014/184568 A1, which can also be coated on a particle filter according to WO2012/071421 A2 and WO2012/156883 A1.

It is known from WO2012/166868 A1 for a zeolite containing palladium and another metal such as iron to be used as a passive nitrogen oxide storage catalyst.

WO2015/085303 A1 discloses passive nitrogen oxide storage catalysts which contain a precious metal and a small-pore molecular sieve with a maximum ring size of eight tetrahedral atoms.

Further passive nitrogen oxide storage catalysts containing palladium and zeolite are disclosed in US2016/250594, US2016/279598 and US2017/001169.

Modern and future diesel engines are becoming ever more efficient, which also lowers exhaust gas temperatures. In parallel, the legislation on the conversion of nitrogen oxides is becoming increasingly stringent. This results in the fact that SCR catalysts alone no longer suffice for compliance with the nitrogen oxide limits. In particular, there is a further need for technical solutions which ensure that nitrogen oxides emitted by the engine over the entire operating window are converted. They must work at low temperatures, as typically occur in the cold start phase and during inner-city drives, as well as at high temperatures and loads, as typically occur during highway drives and accelerations.

US2015/273452, WO2012/166868 A1 and US2014/219878 disclose catalysts that comprise substrate coated over its entire length with a first layer comprising palladium and a zeolite and with a second layer comprising palladium and platinum.

DE202016102586U1 discloses a catalyst that has a substrate coated over its entire length with a first layer comprising a palladium-containing PNA and with a second layer comprising palladium and platinum.

In addition to NOx storage, carbon monoxide and hydrocarbons also have to be reacted. For this purpose, the present invention proposes providing an oxidation-catalytically active catalyst in addition to a passive nitrogen oxide storage catalyst. It has been moreover found, quite surprisingly, that the composition of the oxidation-catalytically active catalyst has an influence on the NOx storage of the passive nitrogen oxide storage catalyst. It has been found, in particular, that as the content of palladium increases in the oxidation-catalytically active catalyst, the low-temperature storage of nitrogen oxides in the passive nitrogen oxide storage catalyst increases.

Accordingly, the present invention relates to the use of a material B containing palladium and platinum in a weight ratio of 2:3 to 10:1 for increasing the low-temperature storage of nitrogen oxides by means of a material A containing palladium and zeolite, wherein material A and material B are present on a carrier substrate of the length L, and wherein material A and material B are different from one another.

Figure 1:
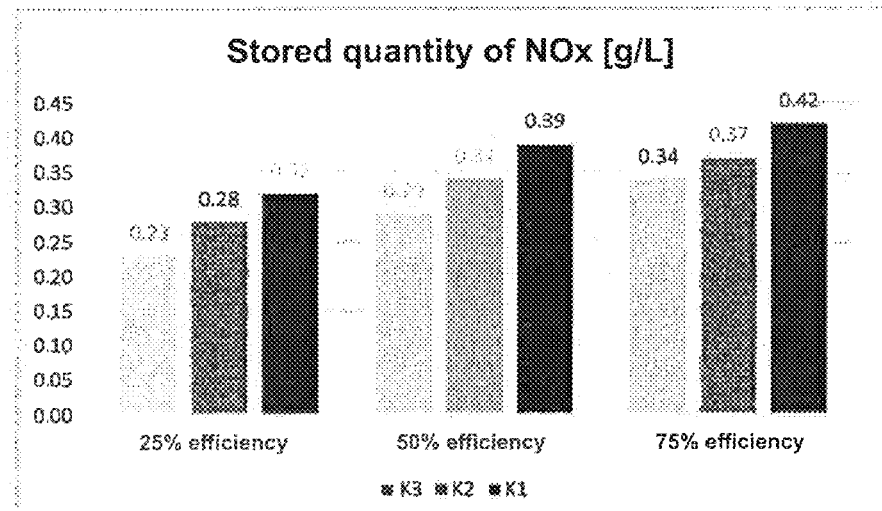
FIG. 1: NOx [g/l] as a function of efficiency [%], which is the fraction of the NOx-storage capacity used, demonstrates that the more Pd is in the upper layer, the more NOx is stored in the lower layer.

In the context of the present invention, low-temperature storage of nitrogen oxides means the storage of nitrogen oxides at temperatures below 200° C., for example at 170° C. to 199° C. At these temperatures, a downstream SCR catalyst is not yet functional and it is not yet possible to meter urea solution into the exhaust tract in order to generate ammonia.

Zeolites are two- or three-dimensional structures, the smallest structures of which can be regarded as $SiO_4$ and $AlO_4$ tetrahedra. These tetrahedra come together to form larger structures, wherein two are connected each time via a common oxygen atom. Rings of different sizes can be formed, for example rings of four, six or even nine tetrahedrally coordinated silicon or aluminum atoms. The various zeolite types are often defined by the largest ring size, because such size determines which guest molecules can and cannot penetrate the zeolite structure. It is customary to differentiate between large-pore zeolites with a maximum ring size of 12, medium-pore zeolites with a maximum ring size of 10, and small-pore zeolites with a maximum ring size of 8.

Zeolites are further divided into structure types by the Structural Commission of the International Zeolite Association, each of which is assigned a three-letter code; see for example Atlas of Zeolite Framework Types, Elsevier, 5th edition, 2001.

Material A preferably contains a zeolite, which can be large-pored, medium-pored or small-pored. In other words, the zeolite preferably has ultralarge channels formed by 6, 9, 10 or 12 tetrahedrally coordinated atoms.

Material A particularly preferably comprises a zeolite of structure type ABW, AEI, AFX, BEA, CHA, ERI, ESV, FAU, FER, KFI, LEV, LTA, MWW, SOD or STT.

Material A very particularly preferably contains a zeolite of structure type AEI, AFX, BEA, CHA, FER or LEV.

Material A contains palladium. Said palladium is preferably present as palladium cation in the zeolite structure, that is to say in ion-exchanged form. However, the palladium may also be wholly or partially present as palladium metal and/or as palladium oxide in the zeolite structure and/or on the surface of the zeolite structure.

The palladium may be present in amounts of from 0.01 to 20% by weight based on the sum of the weights of zeolite and palladium and calculated as palladium metal.

Palladium is preferably present in amounts of from 0.5 to 10, particularly preferably from 0.5 to 6% by weight, and very particularly preferably from 0.5 to 5% by weight, based on the sum of the weights of zeolite and palladium and calculated as palladium metal.

In one embodiment, material A also contains platinum in addition to palladium. The weight ratio Pd:Pt in this case is in particular 20:1 to 1:1. Like palladium, platinum is also preferably present as a platinum cation in the zeolite structure, but may also be present wholly or partially as platinum metal and/or as platinum oxide in the zeolite structure and/or on the surface of the zeolite structure.

Material B preferably comprises palladium and platinum in a weight ratio of 1:1 to 10:1, more preferably 1:1 to 6:1 and very particularly preferably 2:1 to 4:1.

Palladium and platinum in material B are generally present on a carrier material. All materials that are familiar to the person skilled in the art for this purpose are considered as carrier materials. They have a BET surface area of from 30 to 250 m$^2$/g, preferably of 100 to 200 m$^2$/g (determined according to DIN 66132), and are in particular aluminum oxide, silicon oxide, magnesium oxide, titanium oxide, along with mixtures or mixed oxides of at least two of these materials. Aluminum oxide, magnesium/aluminum mixed oxides, and aluminum/silicon mixed oxides are preferred. If aluminum oxide is used, it is particularly preferably stabilized, for example, with from 1 to 6 wt. %, in particular 4 wt. %, to lanthanum oxide.

Carrier material for palladium and platinum in material B is preferably not a zeolite in one embodiment.

In another embodiment, material B includes a material for storing hydrocarbons, particularly at temperatures below the light-off of material B for the oxidation of hydrocarbons. Such storage materials are, in particular, zeolites whose channels are large enough to accommodate hydrocarbons. Preferred zeolites for this purpose are those of structure type BEA.

The support body may be a flow-through substrate or a wall flow filter. A wall flow filter is a support body comprising channels of length L, which extend in parallel between a first and a second end of the wall flow filter, which are alternately closed at either the first or second end and are separated by porous walls. A flow-through substrate differs from a wall flow filter in particular in that the channels of length L are open at its two ends. In an uncoated state, wall-flow filters have, for example, porosities of 30 to 80%, in particular 50 to 75%. In the uncoated state, their average pore size is, for example, 5 to 30 micrometers.

Generally, the pores of the wall-flow filter are so-called open pores, that is, they have a connection to the channels. Furthermore, the pores are normally interconnected with one another. This enables, on the one hand, easy coating of the inner pore surfaces and, on the other hand, easy passage of the exhaust gas through the porous walls of the wall-flow filter.

Like wall-flow filters, flow-through substrates are known to the person skilled in the art and are available on the market. They consist, for example, of silicon carbide, aluminum titanate, or cordierite.

In one embodiment, materials A and B do not comprise any other metal, in particular neither copper nor iron, other than palladium in material A and B and platinum in material B.

In embodiments, material A and material B are present in the form of coatings on the support body, hereinafter referred to as coating A or coating B. Coating A and coating B can be arranged in different ways on the carrier substrate. For example, both coatings may be present as a coating over the entire length L or only over a section of length L of the carrier substrate.

For example, in the case of flow-through substrates, coating A can extend from one end of the support body to 10 to 80% of its length L and the coating B can extend from the other end of the support body to 10 to 80% of its length $L_A$.

It may be, in this case, that $L=L_A+L_B$ applies, with $L_A$ being the length of coating A, and $L_B$ being the length of coating B. However, $L<L_A+L_B$ may also apply. In this case, coatings A and B overlap. Finally, $L>L_A+L_B$ may also apply if a section of the support body remains free of coatings. In the latter case, a gap, which is at least 0.5 cm long, i.e., for example, from 0.5 to 1 cm, remains between coatings A and B.

It is also possible that one coating may extend over the entire length of the support body and the other coating may extend over only part of it.

However, the coatings A and B are preferably both coated over the entire length L. In this case, coating B, for example, may be present directly on the carrier substrate, and coating A on coating B. Preferably, however, coating A is present directly on the carrier substrate and coating B is present on coating A.

In a preferred embodiment, a zeolite of structure type ABW, AEI, AFX, BEA, CHA, ERI, ESV, FAU, FER, KFI, LEV, LTA, MWW, SOD or STT having 0.5 to 5% by weight of palladium is present as a coating directly on the carrier substrate over its entire length L, and a coating containing palladium and platinum in a weight ratio of 2:1 to 4:1 is present likewise over the entire length L on this coating.

In particular, the lower layer (coating A) is present in a quantity of 50 to 250 g/l of carrier substrate and the upper layer (coating B) is present in a quantity of 50 to 100 g/l of carrier substrate.

If the carrier substrate is a wall flow filter, the coatings A and B may extend over the entire length L of the wall flow filter or only part of it, as described above for flow substrates. In addition, the coatings may lie on the walls of the input channels, on the walls of the output channels or in the walls between the input and output channels.

Catalysts in which materials A and B are present in the form of coatings on the carrier substrate can be produced by methods familiar to those skilled in the art, for example by customary dip-coating methods or by pump and suction coating methods with a thermal post-treatment (calcination). The person skilled in the art is aware that, in the case of wall-flow filters, their average pore size and the average particle size of the materials to be coated can be matched to each other in such a manner that they lie on the porous walls that form the channels of the wall-flow filter (on-wall coating). The mean particle size of the materials to be coated can also be selected such that they are located in the porous walls that form the channels of the wall-flow filter; i.e., that the inner pore surfaces are coated (in-wall coating). In this case, the average particle size of the coating materials must be small enough to penetrate into the pores of the wall-flow filter.

In another embodiment, the carrier substrate is formed of material A and a matrix component, while material B is present in the form of a coating on the carrier substrate.

Carrier substrates, flow-through substrates and wall-flow substrates that do not just consist of inert material, such as cordierite, but additionally contain a catalytically active material are known to the person skilled in the art. To produce them, a mixture consisting of, for example, 10 to 95% by weight of an inert matrix component and 5 to 90% by weight of catalytically active material is extruded according to methods known per se. All of the inert materials that are also otherwise used to produce catalyst substrates can be used as matrix components in this case. These are, for example, silicates, oxides, nitrides, or carbides, wherein in particular magnesium aluminum silicates are preferred.

In another embodiment, a carrier substrate composed of corrugated sheets of inert materials is used. Such carrier substrates are known as "corrugated substrates" to those skilled in the art. Suitable inert materials are, for example, fibrous materials with an average fiber diameter of from 50 to 250 μm and an average fiber length of from 2 to 30 mm. Preferably, fibrous materials are heat-resistant and consist of silicon dioxide, in particular glass fibers.

For the production of such carrier substrates, sheets of the aforementioned fiber materials are, for example, corrugated in the known manner and the individual corrugated sheets are formed into a cylindrical monolithically structured body with channels running through the body. Preferably, a monolithically structured body with a crosswise corrugation structure is formed by stacking a number of the corrugated sheets into parallel layers with different orientation of the corrugation between the layers. In one embodiment, uncorrugated, i.e., flat, sheets can be arranged between the corrugated sheets.

Substrates made of corrugated sheets can be coated directly with materials A and B, but they are preferably first coated with an inert material, for example titanium dioxide, and only then with the catalytic material.

By the use according to the invention of material B for increasing the low-temperature storage of nitrogen oxides by a material A, wherein material A and material B are present on a carrier substrate of length L and wherein material A and material B are different from one another, nitrogen oxides can be taken into storage at temperatures below 200° C. and taken out of storage at temperatures above 200° C. The use according to the invention takes place in a purely lean environment, i.e. without enrichment of the exhaust gas. By the use according to the invention it is therefore possible, in combination with a downstream SCR catalyst, to effectively convert nitrogen oxides across the entire temperature range of the exhaust gas, including cold-start temperatures. At the same time, carbon monoxide and hydrocarbons are reacted with very good light-off values In one embodiment of the use according to the invention, an SCR catalyst is present in addition to the carrier substrate of length L on which materials A and B are present.

In principle, the SCR catalyst can be selected from all catalysts active in the SCR reaction of nitrogen oxides with ammonia, in particular those known to the person skilled in the art in the field of automotive exhaust catalysis to be commonly used. This includes catalysts of the mixed-oxide type, as well as catalysts based upon zeolites—in particular, upon transition metal-exchanged zeolites.

In embodiments of the present invention, SCR catalysts are used that contain a small-pore zeolite with a maximum ring size of eight tetrahedral atoms and a transition metal. Such SCR catalysts are described, for example, in WO2008/106519 A1, WO2008/118434 A1, and WO2008/132452 A2.

In addition, large-pored and medium-pored zeolites can also be used, with those of the BEA structure type in particular coming into consideration. Thus, iron-BEA and copper-BEA are of interest.

Particularly preferred zeolites are those of structure type BEA, AEI, AFX, CHA, KFI, ERI, LEV, MER or DDR and are particularly preferably exchanged with cobalt, iron, copper, or mixtures of two or three of these metals.

The term zeolites here also includes molecular sieves, which are sometimes also referred to as "zeolite-like" compounds. Molecular sieves are preferred if they belong to one of the aforementioned structure types. Examples include silica aluminum phosphate zeolites, which are known by the term "SAPO," and aluminum phosphate zeolites, which are known by the term "AlPO." These too are particularly preferred if they are exchanged with cobalt, iron, copper, or mixtures of two or three of these metals.

Preferred zeolites are also those that have a SAR (silica-to-alumina ratio) value of from 2 to 100, in particular of from 5 to 50.

The zeolites or molecular sieves contain transition metal—in particular, in quantities of from 1 to 10 wt %, and especially of from 2 to 5 wt %—calculated as metal oxide, i.e., for example, as $Fe_2O_3$ or CuO.

In preferred embodiments of the present invention the SCR catalysts are zeolites or molecular sieves of the beta type (BEA), chabazite type (CHA), AEI, AFX or Levyne type (LEV) exchanged with copper, iron or copper and iron. Corresponding zeolites or molecular sieves are known, for example, under the designations ZSM-5, Beta, SSZ-13, SSZ-62, Nu-3, ZK-20, LZ-132, SAPO-34, SAPO-35, AlPO-34 and AlPO-35; see, for example, U.S. Pat. Nos. 6,709,644 and 8,617,474.

In one embodiment of the use according to the invention, an injection device for reducing agent is located between the catalyst comprising a carrier substrate of length L, material A and material B, and the SCR catalyst.

The injection device can be chosen freely by the person skilled in the art, wherein suitable devices can be taken from the literature (see, for example, T. Mayer, Feststoff-SCR-System auf Basis von Ammoniumcarbamat, Dissertation, TU Kaiserslautern, 2005, and EP 1 561 919 A1). The ammonia can be injected into the exhaust gas stream via the injection device as such or in the form of a compound from which ammonia is formed under ambient conditions. Examples of suitable compounds are aqueous solutions of urea or ammonium formate, as well as solid ammonium carbamate. As a rule, the reducing agent or precursor thereof is held available in an accompanying container which is connected to the injection device.

The SCR catalyst is preferably in the form of a coating on a support body, which can be a flow-through substrate or a wall-flow filter and can consist of silicon carbide, aluminum titanate, or cordierite, for example. Alternatively, the support body itself can consist of the SCR catalyst and a matrix component as described above; i.e., in extruded form. Finally, the SCR catalyst may also be present as a coating on a corrugated substrate as described above.

COMPARATIVE EXAMPLE 1 a) A zeolite of type LEV is impregnated with 1.5% by weight of palladium (from commercially available palladium tetraamine acetate) ("incipient wetness"). The powder thus obtained is dried at 120° C. and then calcined at 650° C.

b) The resulting calcined powder containing Pd is suspended in demineralized water, mixed with 8% of a commercially available binder based on boehmite and ground in a ball mill. Subsequently, according to a conventional method, a commercially available honeycomb ceramic substrate (flow-through substrate) is coated along its entire length with the washcoat thus obtained. The washcoat load is 143 g/L in relation to the zeolite containing Pd (corresponds to 154 g/L incl. binder), which corresponds to a precious metal load of 60.6 g/ft³ Pd. The catalyst thus obtained is calcined at 850° C. It is hereinafter called VK1.

EXAMPLE 1

The catalyst according to comparative example is provided with a second coating. To this end, a washcoat consisting of Pt/Pd with a ratio of ¼ supported on a silicon-doped aluminum and a beta zeolite is applied to the first layer with a loading of 71 g/L, so that the EM loading is 43 g/ft3. The catalyst obtained is referred to below as K1.

EXAMPLE 2

Example 1 was repeated with the difference that the Pt/Pd ratio in the upper layer was 1:1. The catalyst obtained is referred to below as K2.

EXAMPLE 3

Example 1 was repeated with the difference that the Pt/Pd ratio in the upper layer was 3:2. The catalyst obtained is referred to below as K3.

For comparison of catalysts K1 to K3, the stored quantity of NOx [g/L] was determined at different efficiencies (25%, 50% and 75%). The result is shown in FIG. 1. Accordingly, the quantity of NOx stored (in the lower layer) increases with increasing Pd content in the (upper) layer.

Figure 2:
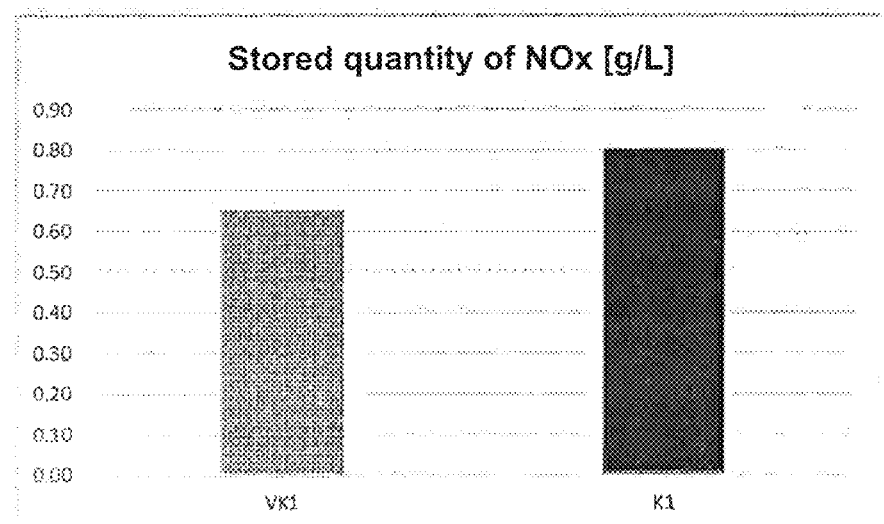
FIG. 2: NOx [g/l] for first layer only (VK1) and with an additional second layer according to the invention (K1) for comparison after a test at the engine applying the WLTC driving cycle. K1 stores more NOx than VK1.

For comparison of catalysts VK1 and K1, the stored quantity of NOx [g/L] at the engine was determined for the WLTC driving cycle. The result is shown in FIG. 2. The results show that K1 stores a larger quantity of NOx than VK1.

The invention claimed is:

1. Use of a material B containing palladium and platinum in a weight ratio of 2:3 to 10:1 for increasing the low-temperature storage of nitrogen oxides at temperatures below 200° C. by means of a material A containing palladium and zeolite, wherein material A and material B are present on a carrier substrate of the length L, and wherein material A and material B are different from one another.

2. Use according to claim 1, characterized in that the zeolite is of structure type ABW, AEI, AFX, BEA, CHA, ERI, ESV, FAU, FER, KFI, LEV, LTA, MWW, SOD or STT.

3. Use according to claim 1, characterized in that the zeolite is of structure type AEI, AFX, BEA, CHA, FER or LEV.

4. Use according to claim 1, characterized in that the palladium is present in material A in amounts of from 0.01 to 20% by weight, based on the sum of the weights of zeolite and palladium and calculated as palladium metal.

5. Use according to claim 1, characterized in that material A contains platinum in addition to palladium.

6. Use according to claim 5, characterized in that palladium and platinum are present in a weight ratio of 20:1 to 1:1.

7. Use according to claim 1, characterized in that the support body is a flow-through substrate or a wall flow filter.

8. Use according to claim 1, characterized in that material A and material B are present in the form of coatings (coating A and coating B) on the carrier substrate.

9. Use according to claim 8, characterized in that coating A is present directly on the carrier substrate and coating B is present on coating A.

10. Use according to claim 8, characterized in that a zeolite of structure type ABW, AEI, AFX, BEA, CHA, ERI, ESV, FAU, FER, KFI, LEV, LTA, MWW, SOD or STT having from 0.5 to 5% by weight of palladium is present as a coating directly on the carrier substrate over its entire length L, and a coating containing palladium and platinum in a weight ratio of 2:1 to 4:1 is present likewise over the entire length L on this coating.

11. Use according to claim 8 characterized in that coating B contains palladium and platinum in a weight ratio of 2/3 to 3/2.

12. Use according to claim 8 characterized in that coating B contains palladium and platinum in a weight ratio of 1/1 to 3/2.

13. Use according to claim 8 characterized in that the carrier substrate is a wall-flow filter with an in-wall coating of coating B.

14. Use according to claim 1, characterized in that an SCR catalyst is present in addition to the carrier substrate of length L on which materials A and B are present.

15. Use according to claim 14, characterized in that the SCR catalyst is a zeolite of structure type BEA, AEI, AFX, CHA, KFI, ERI, LEV, MER or DDR and is exchanged with cobalt, iron, copper, or mixtures of two or three of these metals.

16. Use according to claim 14, characterized in that an injection device for reducing agent is located between the catalyst comprising a carrier substrate of length L, material A and material B, and the SCR catalyst.

* * * * *